United States Patent [19]

Babunovic

[11] 3,710,918

[45] Jan. 16, 1973

[54] CONTAINER FEEDING APPARATUS FOR WASHERS

[75] Inventor: Momir Babunovic, Des Peres, Mo.

[73] Assignee: Barry-Wehmiller Company, St. Louis, Mo.

[22] Filed: Jan. 28, 1971

[21] Appl. No.: 110,386

[52] U.S. Cl. .................................................. 198/30
[51] Int. Cl. ............................................. B65g 47/22
[58] Field of Search ........................... 198/30, 29, 110

[56] References Cited

UNITED STATES PATENTS

| | | | |
|---|---|---|---|
| 3,265,182 | 8/1966 | Bargel | 198/30 |
| 3,493,126 | 2/1970 | Forshier | 198/110 |
| 3,145,825 | 8/1964 | Carter | 198/30 |
| 2,935,173 | 5/1960 | Cozzoli | 198/30 |

FOREIGN PATENTS OR APPLICATIONS 199,748   2/1966   U.S.S.R.

Primary Examiner—Richard E. Aegerter
Attorney—Gravely, Lieder & Woodruff

[57] ABSTRACT

Container washer feed mechanism to prevent uneven and faulty feed of containers to the washer. The mechanism includes feed conveyors periodically reversible to reduce feed pressure at the washer loader and utilize back pressure to aid in obtaining uniform flow of containers. It includes also guide means to establish lanes for the containers and adjustable means on the lane guides to control the size and flow direction of the entrances to the lanes so that container bridging and jamming at the lane entrances is prevented, and the lane entrances are capable of being sized to suit the containers.

5 Claims, 8 Drawing Figures

PATENTED JAN 16 1973 3,710,918

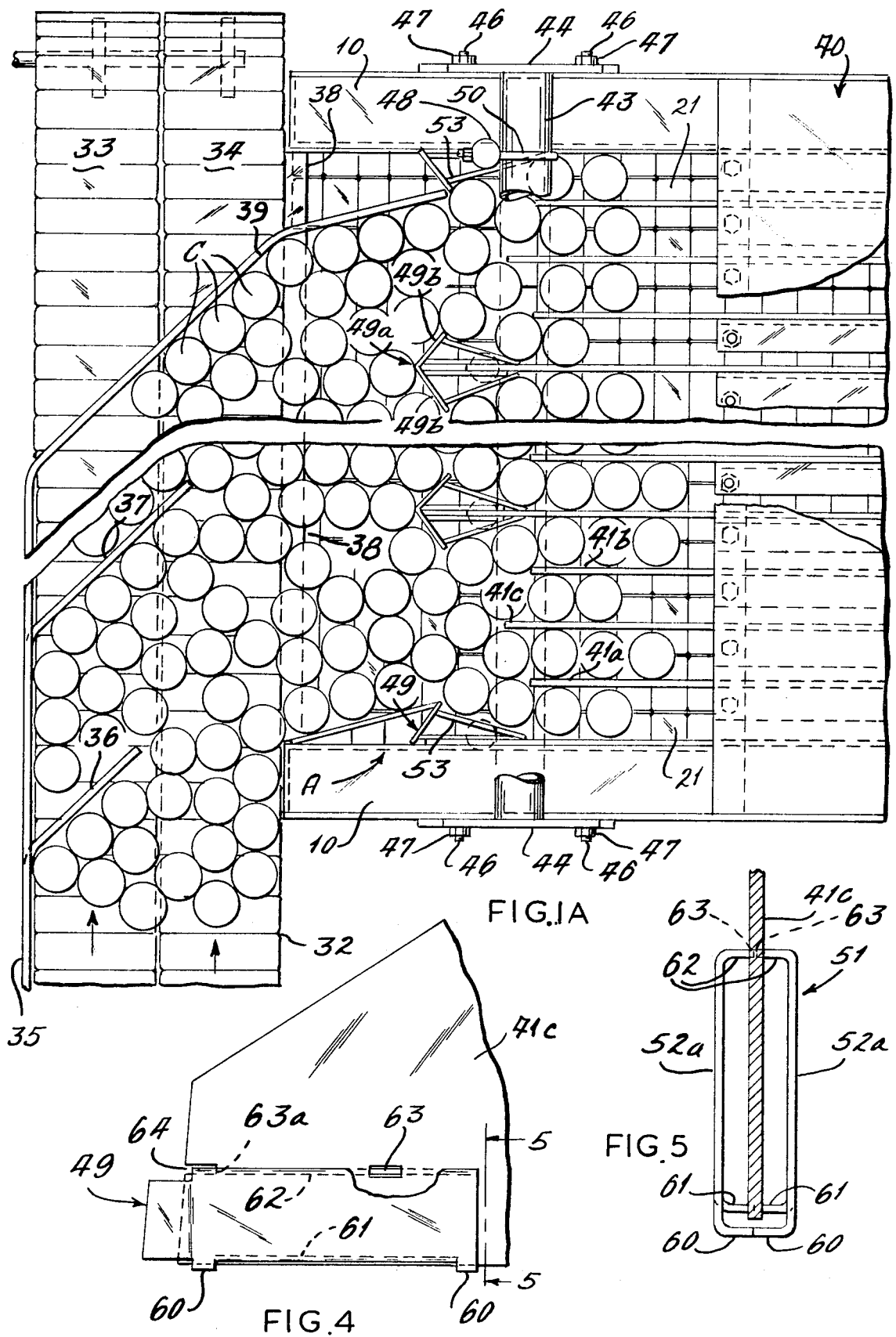

CONTAINER FEEDING APPARATUS FOR WASHERS

BACKGROUND OF THE INVENTION

The present invention relates to apparatus at the loading station of a washer for bottles and like containers which handles a haphazard flow of containers and feeds the containers into a plurality of single file lanes without the containers jamming in or bridging across the entrance to any lane.

In bottle washers for the brewing and soft drink industries where the bottles are returned for reuse, the capacity or output of the washers is obtained by having many side-by-side rows of container carriers or pockets so that the output can be in the order of hundreds of bottles per minute. Feeding bottles or frangible containers properly and efficiently into such washers requires continuous, uninterrupted flow from the source to assure that all rows in the washer are filled.

Usually, the flow of containers from the return case unloading station is haphazard, and no attempt is made to organize such a flow into single file rows until just as the containers reach the loading mechanism for the washer pockets. Such loading mechanism is seen in the prior patent of Vamvakas U.S. Pat. No. 3,346,094 issued Oct. 10, 1967. The present apparatus is operatively located ahead or upstream of the loader mechanism of that patent. The trends to date have evolved complicated apparatus which include stirring devices, start and stop conveyors, and oscillating fins, all of which require mechanical components and parts that are complicated to service and keep operative, are expensive to manufacture, and require expert care and maintenance.

An efficiently operated washer for containers, such as frangible bottles or like containers, must have a constant supply at the loading station so that the washer output represents the maximum capacity. Inefficiently operated washers are those which usually lose output capacity because the feed is starved for a variety of reasons. One reason is that the supply of containers is insufficient to match the operating speed of the washers, another reason is that in washers having multiple rows of pockets the incoming flow is unevenly distributed across the loading stations. Starving the loading station of a multiple row washer can be attributed to a number of effects such as excessive container pressure because of the haphazard convergence of the containers toward the washer, and because of incorrect location or design of guide members which provide therebetween lanes for the establishment of single file rows of containers. Incorrect design of guide members can result in the containers jamming at the entrance or bridging over the entrance so that certain lanes are not constantly filled with bottles able to move into the washer. Of the foregoing defects, perhaps the most serious is the development of excessive pressure which is generally caused by the interaction of adjacent containers driving into each other which causes bridging or jamming between the stationary structures. It is recognized that such pressure can be caused by the feeding conveyor operating continuously to attempt to deliver an uninterrupted flow of containers to the feeder table, while the usual rotary loader operates intermittently to remove containers from the feeder table and load them into the pockets of the washer. During the time interval that each container waits for the intermittent loading function, pressure builds up in the feed table because of the continuous delivery.

SUMMARY OF THE INVENTION

It is an important object of this invention to provide apparatus for obtaining uninterrupted flow of containers into single file lanes or rows in advance of the actual washer loading mechanism so that the foregoing enumerated problems in the art may be overcome in a simple relatively trouble-free manner.

It is another object of the invention to provide container feeding apparatus for washers in which multiple rows of containers are formed between guide members, and wherein means associated with the guide members assures complete filling of the respective rows at all time.

A further object of the invention is to provide apparatus of the foregoing character in which guide means are provided with devices for preventing bridging or jamming at the entrance and wherein such devices are adjustable to accommodate a range of bottle sizes.

Still another object of the invention is to provide adjustable devices for selected ones of the line-forming guide means and for arranging adjacent guide means to cooperate in the promotion of an uninterrupted flow of containers into the respective lanes formed between the guide means.

The objects of this invention are attained in an embodiment which includes a plurality of guide members arranged in side-by-side relation and extending horizontally from container receiving ends toward container discharge ends, the receiving ends of certain of said guide members being extended further toward the container source of supply than other adjacent guide members, container movement control means carried on certain guide members in position to define openings with adjacent guide members of a size to allow no more than two adjacent containers to pass simultaneously, and conveyor means movable below said guide members to support and move containers between said guide members and through said openings, whereby said control means and adjacent guide members are rendered effective to form the containers into rows, said conveyor means being periodically reversible to reduce the pressure of the containers adjacent the receiving ends of said guide members.

BRIEF DESCRIPTION OF THE DRAWINGS

FIG. 1 A is another fragmentary view like FIG. 1 but for container feeding apparatus for a different container size;

FIG. 4 is a fragmentary elevational view of a removable plow device applied to certain of the guide members shown in FIG. 1;

FIG. 5 is a fragmentary sectional view taken at line 5—5 in FIG. 4;

DESCRIPTION OF THE APPARATUS

Figure 1:
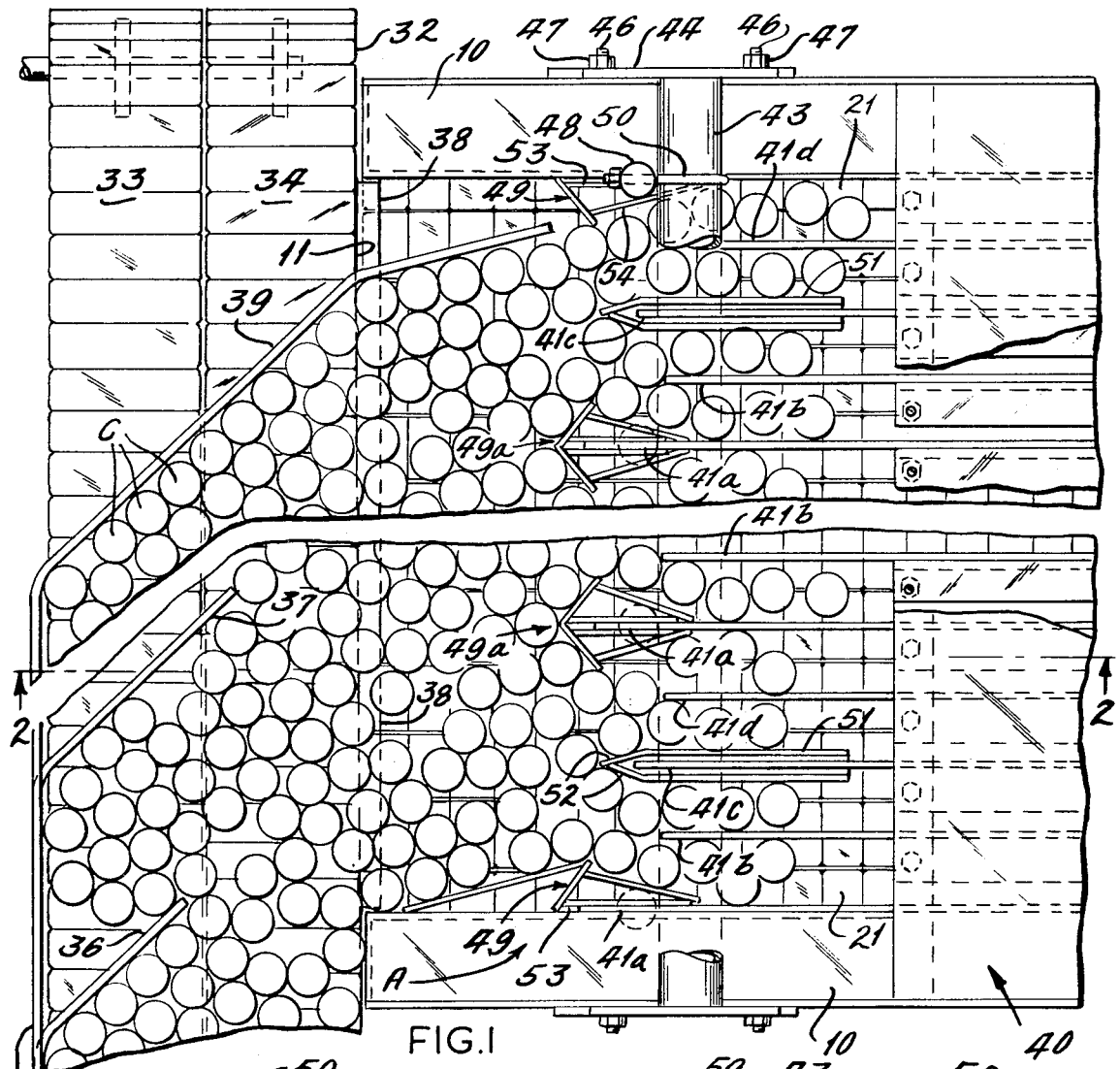
FIG. 1 is a fragmentary plan view of container feeding apparatus for washers showing the various components for one size container.
Figure 3:
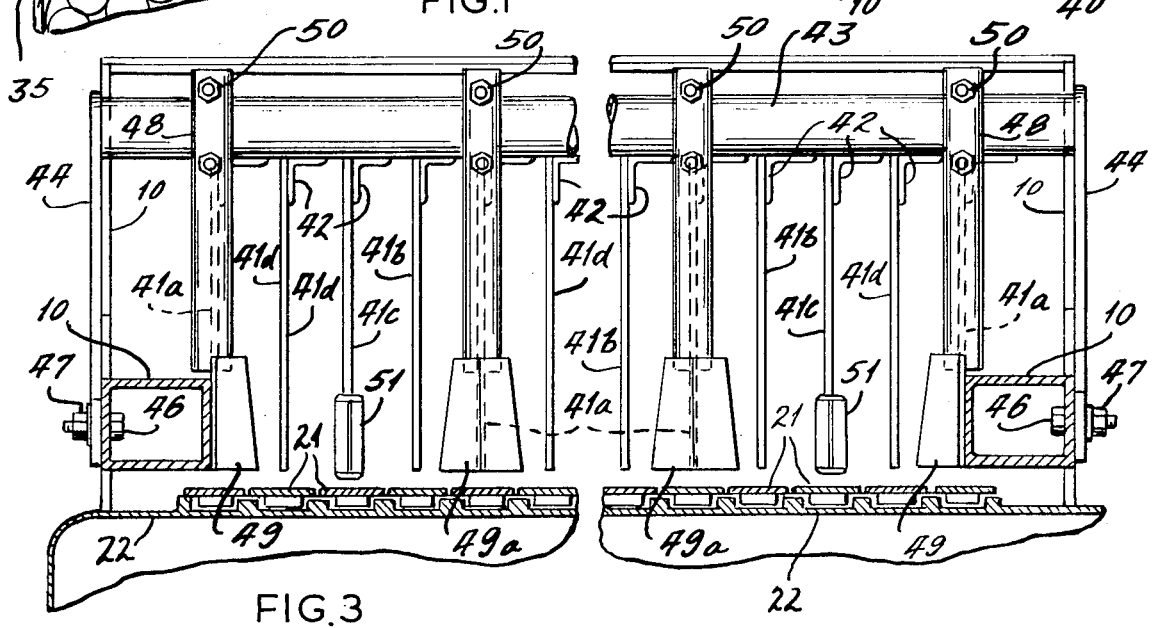
FIG. 3 is a fragmentary sectional elevational view of the apparatus seen along line 3—3 in FIG. 2.
Figure 2:
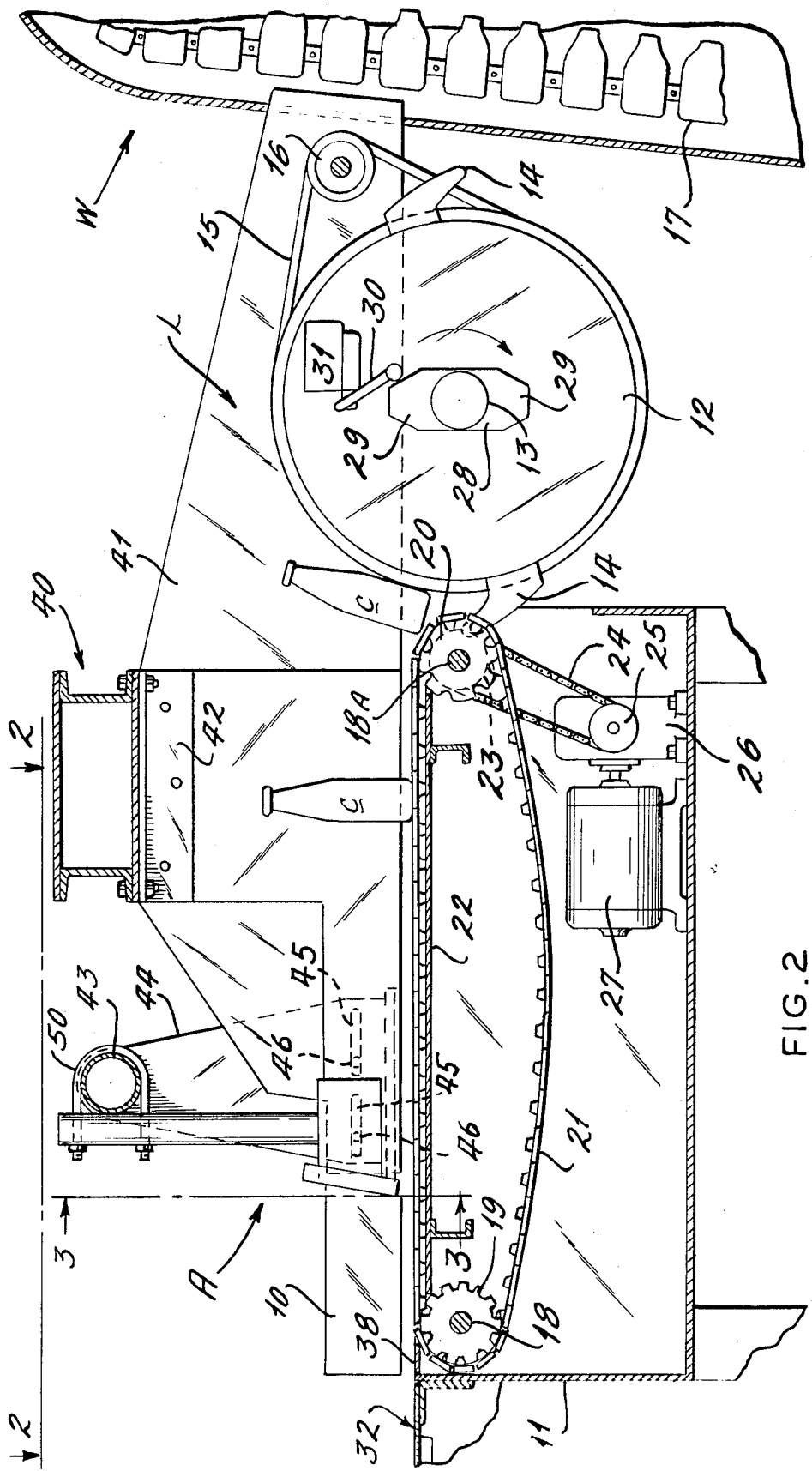
FIG. 2 is a longitudinal sectional elevational view taken along line 2—2 in FIG. 1.

Referring now to FIGS. 1, 2 and 3 of the drawings which illustrate the preferred embodiment, it can be seen that the container feeding apparatus A has a framework including side members 10 spaced apart by the width of the washer which is shown generally at W. The sides 10 are connected at the outer end by a cross member 11 and by other structure which will appear and be recognized as obvious. The framework constituted by the members 10 and 11 extends outwardly from the washer loader mechanism L and constitutes the assembly usually associated with the loading station of the washer W. The loading station is equipped with a rotary cable loader assembly which it is not necessary to explain in detail, but which generally includes a rotary drum 12 mounted on a horizontally elongated shaft 13. The drum consists of a plurality of segments in side-by-side relation widthwise of the washer, and each is equipped with a pair of container lifting fingers 14 which engage the bottom of containers C and propel the containers upwardly from a generally vertical position to a horizontal position supported on and between a pair of flexible cables 15. The several cables 15 are trained about the drum and also pass around idler pulleys 16 positioned closely adjacent the path of movement of the several pocket conveyors 17 in the washer W. The general arrangement and organization of the cable loader and washer is more fully seen in Vamvakas U.S. Pat. No. 3,346,094, granted Oct. 10, 1967.

The frame sides 10 are provided with suitable supports for cross-shafts 18 and 18A on which are supported sprockets 19 and 20 respectively. The shaft 18 supports a series of sprockets 19 each of which is adapted to engage a typical table top chain conveyor 21 which has its container feeding path horizontally directed over a stationary supporting structure 22. The table top conveyors 21 pass around sprockets 20 on shaft 18A. The shaft 18A is provided with a power input sprocket 23 which is connected by a suitable drive chain 24 to the power output sprocket 25 associated with a transmission 26 powered by a suitable prime mover 27.

The operation of the prime mover 27 for driving the flexible table top conveyors 21 is subject to control for forward and reversing operation by means of a suitable cam 28 mounted on an end portion of the shaft 13 for the loader drum 12. The cam 28 has as many lobes 29 as there are container lifting fingers 14. In the present case there are two lifting fingers diametrically opposed and, therefore, there are two cam lobes 29. Each lobe moves in a path so as to engage a reversing switch actuating arm 30 and move the switch arm in the manner indicated to control the function of a reversing switch 31 connected into the electrical power source for the prime mover 27. Each time the switch arm 30 is engaged by a cam lobe 29 it operates the switch 31 to break a circuit for driving the prime mover 27 to feed containers into the washer and makes a reversing circuit so that the prime mover 27 is momentarily reversed, whereby the table top conveyor chains 21 are driven in a reverse direction so as to momentarily relieve the forward or feeding pressure of containers on the containers which are about to be engaged by the respective lifting fingers 14. As soon as the fingers 14 have displaced the respective containers upwardly and toward a horizontal attitude, the cam lobe 29 will pass the arm 30 and release the reversing switch operating arm 30 so the switch will return to its forward drive position.

Directed longitudinally of the end wall or plate 11 for the present apparatus is a suitable structure 32 (FIG. 2) which is designed to support side-by-side container supply conveyors 33 and 34, each of which is typically formed with table top plates in the flexible linkage. The structure 32 supports suitable guide fence 35, and the guide fence is provided with suitable container deflector means 36 and 37 spaced along its length. The deflectors 36 and 37 extend across the supply conveyor 34 so as to deflect the incoming containers C onto the supply conveyor 33 from which conveyor they are crowded across a deadplate 38 and onto the several table top conveyors 21 which carry the containers into the cable loader W previously described. The guide fence 35 is formed with a final deflector 39 which is directed across both the supply conveyors 33 and 34 and into the receiving end of the most remote one of the conveyors 21.

In FIGS. 1 and 2 it can be seen that the sides 10 support a box structure 40 which forms a catwalk elevated above the conveyors 21 and extending from side to side of the apparatus. The structure 40 supports a plurality of lane forming guides 41 by means of suitable angle brackets 42. Each of the guide members extends downwardly so as to lie closely above the conveyors 21 and intermediate the width of the individual conveyors 21. A plurality of lanes are defined by the guide members 41 and each lane has a width sufficient to accommodate the largest size container capable of being received in the washer W. In the plan view of FIG. 1 the respective guide members 41 have their lead edges staggered or arranged so as to project toward the incoming flow of containers at different distances. For example, a first guide emember 41 has its lead edge 41a advanced further forward than the next adjacent guide leading edge 41b, and the lead edge 41b is not as far advanced forwardly as the lead edge 41c of the next adjacent guide member 41. However, the leading edge 41c is not advanced further ahead than the lead edge 41a of the first guide member 41. The next adjacent guide leading edge 41d is positioned substantially in alignment with the leading edge 41b of the second guide member 41. This arrangement of leading edges of the group of guide members 41 is repeated across the entire width of the several conveyor chains 21, or in other words, every fourth guide member is positioned with its lead edge 41a projecting further into the incoming flow of containers, and every third guide member has its leading edge 41c projecting further forward than the leading edges 41b and 41d of the guide members on either side thereof, but not as far forward as every fourth guide member. The reason for this will appear presently.

In FIGS. 2 and 3 it can be seen that the several guide members 41 are supported by angle brackets 42 from the catwalk structure 40. Forwardly of the catwalk structure 40 there is suitably positioned a tubular support 43 carried by its opposite ends on vertical plates 44 which are adjustably mounted on the side wall members 10 of the apparatus frame. The lower end of each of the plates 44 is provided with a pair of horizontally directed elongated slots 45 which receive threaded clamping elements 46 that are fixed in the side members 10. Clamping nuts 47 engage each of the elements 46 and serve to secure the support plates 44 in adjusted position. In the present case the plates 44 may have two primary positions as will presently appear. The tubular support 43 is intended to carry vertically directed posts 48. The two opposite end posts 48 support half plow devices 49, and intermediate posts 48 support whole plow devices 49a. U-shaped clamps 50 secure the upper ends of posts 48 in position on the tubular support 43. It is observed that in adjusting the horizontal position of the support plates 44 that the plows 49 and 49a are simultaneously adjusted relative to the end edges of guide members 41 with which they are associated so that the respective plows can be advanced or retracted relative to the associated guide members without having to disturb the general setting of the collective guide members 41. In particular, each of the posts 48 associated with a plow 49 or 49a is engaged by the associated guide member 41 so as to keep the posts in lateral alignment and to afford stability for the plows.

Every third guide member has its end edge 41c provided with a removable plow adapter device 51 (FIG. 5). Each of the plow adapters 51 is formed with spaced apart bevelled surfaces 52 so as to form plow points on the end edge of the guide member on which it is carried and thereby reduce the entrance space relative to the adjacent end edges of guide member 41b and 41d, as well as to reduce the spacing relative to the tips of the plows 49 and 49a.

Each plow 49a includes a pair of spaced support plates 53 adapted to receive the lane guide end edge 41a in a sliding fit. Struts 54 connect the tip portions 49b of the plows 49a with the plates 53, and the lower ends of the posts 48 are suitably secured to the plates 53 and struts 54. The one-half plows 49 at each side of the feed table have a single plate 53 and a single strut 54 to which the lower ends of the posts 48 are secured. Thus, when the tubular support 43 is longitudinally adjustably moved by the support plates 44 the several plows 49 and 49a are moved together inwardly or outwardly on the end edges of the lane guides 41 so that the entrance dimensions to the lanes may be adjusted to suit the size of containers being moved by the several feed conveyors 21.

Figure 6:
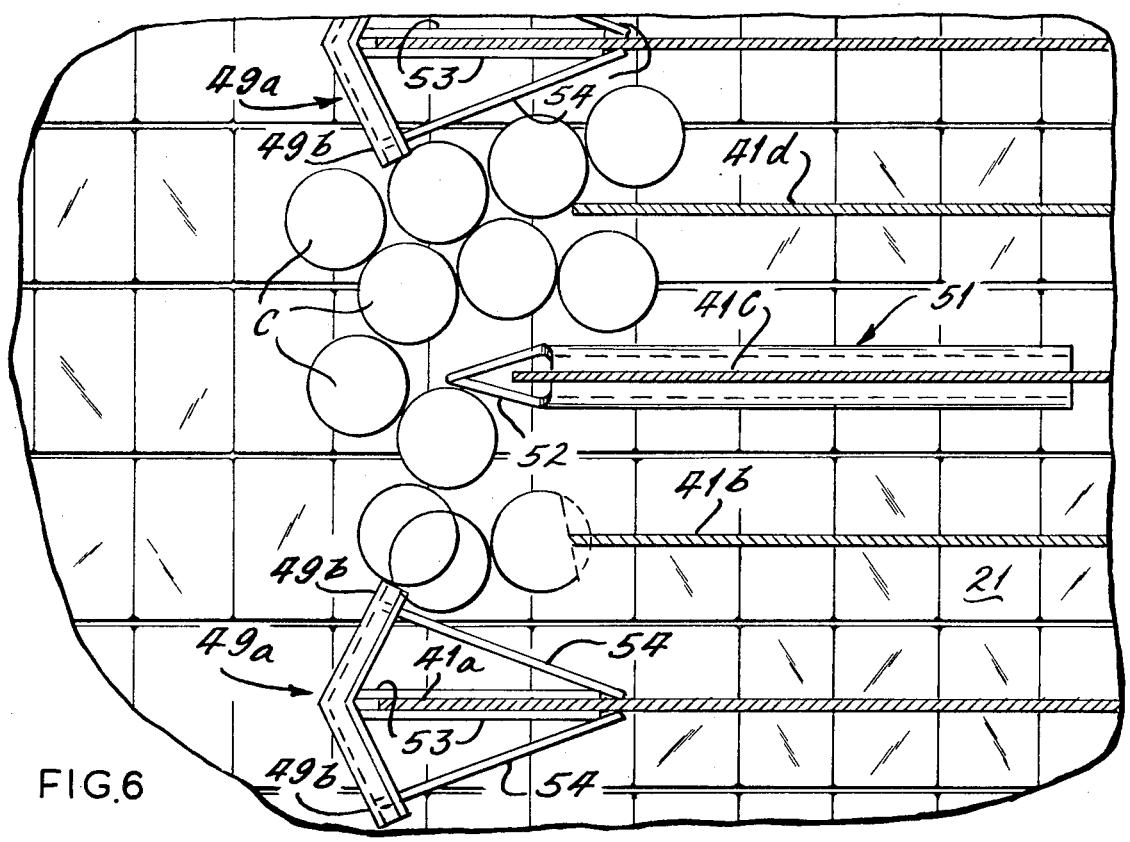
FIG. 6 is a greatly enlarged fragmentary plan view of a portion of the apparatus of FIG. 1 in which the geometrical relationship of the components is shown to better advantage in relation to small diameter containers.

As can be appreciated from inspection of FIGS. 1 and 6, the apparatus is adjusted with the tubular support 43 set more rearwardly relative to the feed of the haphazard flow of containers C, and the plows 49 and 49a are retracted thereby. Also the removable plows 51 are positioned on guide end edges 41c to provide additional forward length and width thereto. Thus, the distance from the adjacent tips 49b of the forward plows to the nearest surfaces 52 on the removable plows 51 is limited to a space substantially equal to the diameter of two containers plus a fraction of an inch excess. Thus, for containers having diameters of 2⅛ inches, the excess space will be one-eighth to one-sixteenth inch. Also, the distance from the forward plow tips 49b to the tip of the guide end edges 41b and 41d will be less than the diameter of two containers. When the plows are thus adjusted, the containers are prevented from bridging over the entrances to the lanes between guides 41 and no blockage can ensue. Thus, the entrances to the several lanes are maintained in condition to always admit containers in single file order which, with momentary reverse travel of the conveyors 21, will assure a full line of containers in each and every lane.

Figure 7:
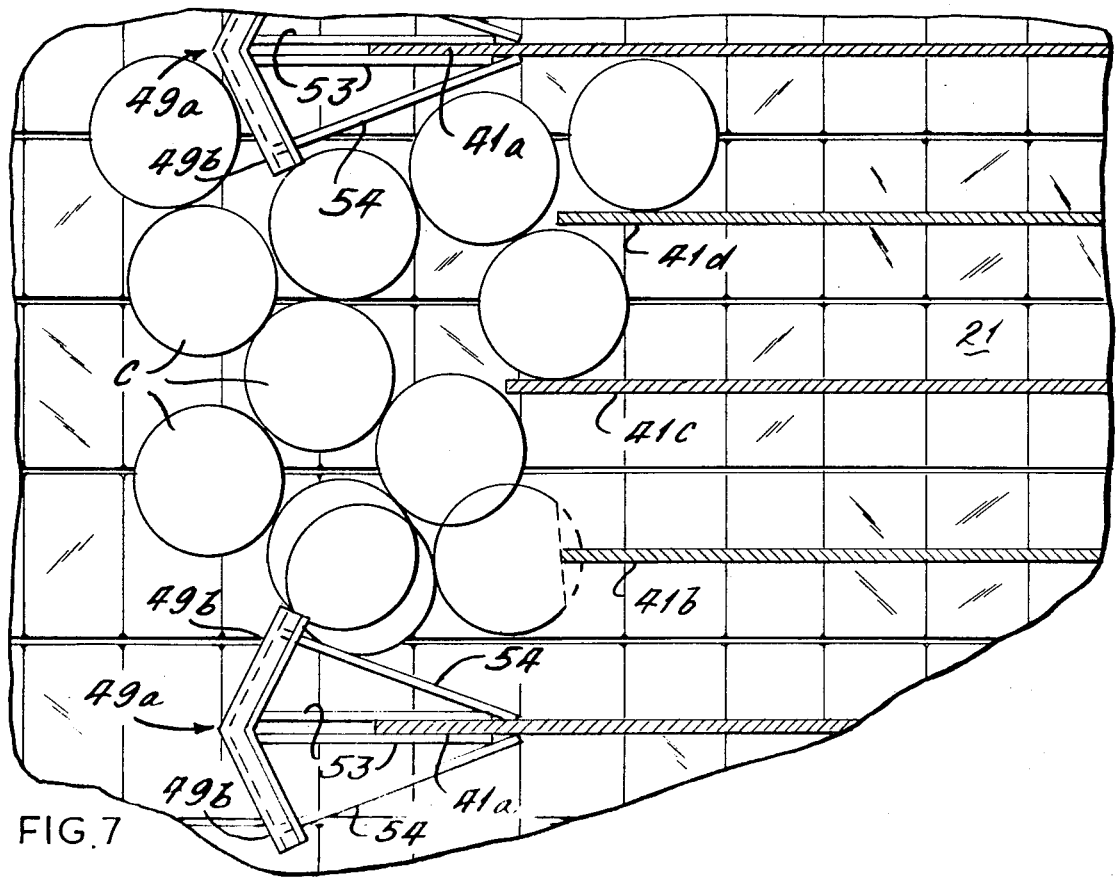
FIG. 7 is a view similar to FIG. 6 but showing a different organization of components for handling larger size containers.

Turning now to FIG. 7 there is seen a fragmentary portion of the feed table of FIG. 1A with the intent of accommodating large diameter containers C. In this setting the support plates 44 are advanced more into the feed of containers so that the tubular support 43 moves the posts 48 to the broken line position seen in FIG. 2. In this setting plows 49 and 49a are slid forwardly on the respective lane guides 41, and the removable plows 51 are now removed. As a result the distance from the tips of the plows 49b to the end edges of the guides 41c is opened up an amount to accommodate two containers plus a fraction of an inch more. If the container diameter is 2 15/16 inches this distance will be one-eighth to one-sixteenth inch more than two such containers. The distance from the plow tip 49b to the end edges of the nearest guides 41b and 41d will be less than two container diameters. Here again, the purpose is to prevent containers bridging over at the lane entrance and starving the lanes of a full line of containers. Reversal of the container conveyors 21 will assist in overcoming the starving of the lanes by stirring up the containers and causing a momentary back pressure at the lane entrances. The adjustability of the plows is such that many settings may be selected to overcome any tendency for blockage at the entrances to the several lanes.

In FIGS. 4 and 5 there has been shown the feature of a typical plow 51 mounted on lane guide 41c. The bevelled surfaces 52 of this plow are continuations of side plates 52a, and the side plates are interconnected by tabs 60 spaced along the bottom margin of the guide 41c. The plates 52a are held spaced from the guide 41c by inturned flanges 61 which extend between the tabs 60 along the lower margin of guide 41c, and by inturned flanges 62 along the upper edge of the plates 52a. The means for releasibly retaining the plow 51 on the guide 41c comprises tabs 63 and 63a which project inwardly from the upper flange 62 and seat in suitable receiving slots or apertures, one being seen at 64, in the guide 41c. Thus, a snap-on action is achieved for plows 51.

There has now been described in conjunction with the drawings apparatus for feeding containers of various sizes into the loading apparatus for washers and other container processing equipment. The features of importance are the provision of adjustable and removable plows to determine the dimensions of the entrances to the several lanes for multiple feed of containers from a haphazard flow into single file lanes, and the provision of reversibility of the container feed conveyors to momentarily relieve the feed pressure at the loader mechanism as well as create back pressure at the lane entrances to further cause the containers to arrange themselves for smooth flow into the lanes.

What is claimed is:

1. In apparatus for feeding containers from a haphazard source into a plurality of side-by-side rows, the improvement of a plurality of guide members arranged in side-by-side relation and extending horizontally from container receiving ends toward container discharge ends, the receiving ends of certain of said guide members being extended further toward the container source of supply than other adjacent guide members, container feeding movement control means carried on said certain guide members in position to define openings with adjacent guide members of a size to allow no more than two adjacent containers to pass simultaneously, said container movement control means includes first plow devices having angularly formed container engaging surfaces, said first devices being longitudinally movable on said certain guide members, and other plow devices having angularly formed container engaging faces, said other plows being detachable from others of said guide members, conveyor means movable below said guide members to support and feed containers between said guide members and through said openings, whereby said control means and adjacent guide members are rendered effective to form the containers into rows, prime mover means operatively connected to said conveyor means, and control means for said prime mover operative periodically to reverse the operation of said prime mover and drive said conveyor reversely to its feed direction to reduce the pressure of the containers adjacent the receiving ends of said guide members.

2. In apparatus for feeding containers from a haphazard source into a plurality of side-by-side rows, each row being a single file alignment of containers, the improvement with a plurality of table-top conveyors constituting a common wide platform for supporting the containers during feeding movement between receiving and discharge ends of a plurality of container file alignment guides arranged in spaced side-by-side relation across the width of the conveyor platform, first guide means thereof having ends extending farthest toward said conveyor receiving end, second guide means thereof having ends extending least farthest toward said conveyor receiving end, and third guide means thereof having ends extending toward said conveyor receiving end a distance intermediate the extending said first and second guide means, each of said third guide means being grouped with and disposed between a pair of said second guide means and said first guide means being located at each side of a group of second and third guide means, adjustable container flow controlling plow devices carried on the extended ends of each first guide means and removable plow devices carried on the extended ends of each third guide means, said adjustable and removable plow devices cooperating with each other to form limited size entrance passages for container flow into and between said respective guide means, reversible prime mover means operatively connected to said conveyors to effect container feeding flow into and between said guide means, and prime mover reversing means periodically reversing said conveyors to back the containers away from said guide means and effect a change in the feeding movement of the containers, whereby the plow devices and conveyor reversals combine to inhibit containers bridging across the extended ends of said guide means.

3. The apparatus of claim 2 wherein said adjustable plow devices divert containers from flowing straight into the adjacent spaces between said guides, said adjustable plow devices having means thereon angled toward but spaced from the leading edges of said second and third guide means a predetermined distance calculated to inhibit bridging and jamming of the containers adjacent the leading edges of said guide members.

4. The apparatus of claim 2 wherein said plow devices adjacent said third guide members are removable to change the distance said leading edges of said third guide members extend toward the source of containers, and means effecting movement of said plow devices adjacent the leading edge of said first guide means, the movement of said last mentioned plow devices and the removability of said removable plow devices selectively determining the distance between said guide means to match changes in the size of containers received between said guide means.

5. The apparatus of claim 4 wherein said plow devices adjacent the leading edges of said first guide members are movable together and slide relative to the leading edges of said first guide members, and means is provided to secure said movable plow device in selected moved positions.

* * * * *